US008525433B2

(12) United States Patent
Lee et al.

(10) Patent No.: US 8,525,433 B2
(45) Date of Patent: Sep. 3, 2013

(54) LED LIGHT EMITTING DEVICE AND METHOD OF DRIVING THE SAME

(75) Inventors: Dong-Hun Lee, Bucheon (KR);
Kyung-Goo Lee, Incheon (KR);
Hong-Gyu Han, Anyang-si (KR);
Jung-Won Kim, Seoul (KR); Dong-Hee Kim, Bucheon-si (KR)

(73) Assignee: Silicon Mitus, Inc., Seoul (KR)

( * ) Notice: Subject to any disclaimer, the term of this patent is extended or adjusted under 35 U.S.C. 154(b) by 504 days.

(21) Appl. No.: 12/825,635

(22) Filed: Jun. 29, 2010

(65) Prior Publication Data
US 2011/0001433 A1      Jan. 6, 2011

(30) Foreign Application Priority Data

Jul. 1, 2009 (KR) .................. 10-2009-0059684

(51) Int. Cl.
*H05B 37/02* (2006.01)
(52) U.S. Cl.
USPC ........................... 315/291; 315/307; 315/308
(58) Field of Classification Search
USPC .................. 315/185 R, 209 R, 224, 225, 291, 315/307, 308, 312, 317, 361
See application file for complete search history.

(56) References Cited

U.S. PATENT DOCUMENTS

| | | | |
|---|---|---|---|
| 6,161,910 A * | 12/2000 | Reisenauer et al. | 315/309 |
| 8,004,207 B2 * | 8/2011 | Elder | 315/291 |
| 8,179,051 B2 * | 5/2012 | Zhao | 315/185 R |
| 2006/0208669 A1 * | 9/2006 | Huynh et al. | 315/312 |

FOREIGN PATENT DOCUMENTS

JP    2006-318337 A    11/2006

OTHER PUBLICATIONS

Anton Bakker et al., A CMOS Nested-Chopper Instrumentation Amplifier with 100-nV Offset, IEEE Journal of Solid-State Circuits, vol. 35, No. 12, Dec. 2000, pp. 1877-1883.
Christian C. Enz et al., Circuit Techniques for Reducing the Effects of Op-Amp Imperfections, IEEE, vol. 84, No. 11, Nov. 1996, pp. 1584-1614.

* cited by examiner

*Primary Examiner* — Jimmy Vu
(74) *Attorney, Agent, or Firm* — Lexyoume IP Meister, PLLC

(57) ABSTRACT

An LED light emitting device and a method of driving the same are provided, and technology that can uniformly sustain the magnitude of a channel current flowing to a plurality of LED channels is disclosed. The LED light emitting device includes: a plurality of LED channels that are formed with a plurality of LED elements that are continuously connected in series; and a constant current source that controls each channel current flowing to the plurality of LED channels according to a predetermined channel reference current to be a predetermined setting channel current, wherein the constant current source includes a plurality of operating amplifiers that control the magnitude of each of the channel currents, and a feedback voltage generating according to a predetermined offset reference current is input to a second input terminal of an operating amplifier for an offset setting period that sets an offset voltage of the plurality of operating amplifiers, a reference voltage generating according to a channel reference current is input to a first input terminal of the operating amplifier, and an offset voltage of each of the plurality of operating amplifiers is set so that an actual channel current may be identical to a predetermined setting channel current.

19 Claims, 5 Drawing Sheets

_US 8,525,433 B2_

LED LIGHT EMITTING DEVICE AND METHOD OF DRIVING THE SAME

CROSS-REFERENCE TO RELATED APPLICATION

This application claims priority to and the benefit of Korean Patent Application No. 10-2009-0059684 filed in the Korean Intellectual Property Office on Jul. 1, 2009, the entire contents of which are incorporated herein by reference.

BACKGROUND OF THE INVENTION (a) Field of the Invention

The present invention relates to a light emitting diode (LED) light emitting device and a method of driving the same. More particularly, the present invention relates to an LED light emitting device that have a DC/DC converter and a constant current source and that include a plurality of LED channels in which a plurality of LEDS are connected in series and a method of driving the same.

(b) Description of the Related Art

A light emitting device can be used for displaying an image, or can be used as a light source of a display device such as a liquid crystal display (LCD). Particularly, a light emitting device that is formed with a plurality of LEDS is widely used as a back light of an LCD. An LED light emitting device includes a plurality of LED channels in which a plurality of LED elements are arranged in series and a DC/DC converter that supplies an output voltage to each of the plurality of LED channels. An output voltage is supplied to one ends of each of the plurality of LED channels, and a constant current source that controls a current flowing to each of the plurality of LED channels is connected to the other end thereof. The constant current source includes a sync current source and controls a current flowing to each of the LED channels using an operating amplifier to be constant.

FIG. 1 is a diagram illustrating an LED light emitting device and illustrates a method of controlling a current flowing to an LED channel using an operating amplifier.

Referring to FIG. 1, the magnitude of a channel current ILED flowing to an LED channel 10 is uniformly controlled by a sync current source 20. Specifically, the sync current source 20 includes an operating amplifier AMP and synchronizes a predetermined channel current ILED according to the output of the operating amplifier AMP. The operating amplifier AMP receives a reference voltage VREF according to a reference resistor Rref and a reference current Iref in a non-inversion terminal (+) and receives a feedback voltage Vfb according to a channel current ILED flowing through a switch M and a detection resistor Rs in an inversion terminal (−). The sync current source 20 controls the channel current ILED so that the reference voltage VREF may be identical to the feedback voltage Vfb. Therefore, the channel current ILED is proportional to the reference current Iref as represented by Equation 1.

$$ILED=(Rref/Rs)*Iref \qquad \text{(Equation 1)}$$

Therefore, the LED channel current ILED can be set to flow in a desired magnitude using the reference current Iref. However, a predetermined offset voltage exists between a non-inversion input terminal (+) and an inversion input terminal (−) of an actual operating amplifier AMP. Further, an error occurs in the magnitude of an actual reference current Iref, a reference resistor Rref, and a detection resistor Rs. Thereby, an error occurs in an LED channel current ILED that is set to a desired magnitude. Further, when a plurality of LED channels are included, errors of an offset voltage, a reference current Iref, a reference resistor Rref, and a detection resistor Rs of each LED channel are different. Therefore, there is a problem that an LED channel current ILED flowing to each LED channel is not same. In order to solve the problem, the detection resistor Rs is formed with a plurality of resistors and is trimmed so that a preset channel current ILED flows at each LED channel. However, in such a method, upon actually trimming, when a channel current of the magnitude different from that of the preset channel current ILED flows, an error occurs between channel currents ILED flowing to each LED channel. Further, there is a method of canceling an offset voltage of the operating amplifier. However, in this method, because an error still exists in the reference current Iref, the reference resistor Rref, and the detection resistor Rs, there is a limitation in uniformly sustaining an LED channel current ILED flowing to each LED channel.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide an LED light emitting device and a method of driving the same having advantages of uniformly sustaining the magnitude of a channel current flowing to a plurality of LED channels.

An exemplary embodiment of the present invention provides an LED light emitting device including: a plurality of LED channels that are formed with a plurality of LED elements that are continuously connected in series; and a constant current source that controls each channel current flowing to the plurality of LED channels according to a predetermined channel reference current to be a predetermined setting channel current, wherein the constant current source includes a plurality of operating amplifiers that control the magnitude of each of the channel currents and sets an offset voltage of each of the plurality of operating amplifiers so that an actual channel current may be identical to the predetermined setting channel current. In the LED light emitting device, a feedback voltage generating according to a predetermined offset reference current for an offset setting period that sets an offset voltage of the plurality of operating amplifiers may be input to a first input terminal of the operating amplifier, a reference voltage generating according to the channel reference current may be input to a second input terminal of the operating amplifier, and an offset voltage of each of the plurality of operating amplifiers may be set so that a difference between the feedback voltage and the reference voltage may be identical to an offset voltage. The offset reference current may be identical to the setting channel current. The constant current source may include a reference current setting unit that generates the offset reference current and the channel reference current using a set reference current; a plurality of reference resistors having one end that is connected to a plurality of channel reference current sources that supply the channel reference current and having the grounded other end; a plurality of sync current sources that are connected to an end portion of each of the plurality of LED channels to synchronize the plurality of channel currents; and a plurality of offset voltage setting units that set the offset voltage according to the output of the plurality of operating amplifiers. Each of the plurality of sync current sources may include a control switch having a drain terminal that is connected to an end portion of each of the plurality of LED channels; a detection resistor having one end that is connected to a source terminal of the control switch and having the grounded other end; and the operating amplifier having the first input terminal that is connected to the reference resistor and having the second input terminal that is connected to one end of the detection resistor and having an output terminal that is connected to the gate terminal of the control switch. The first input terminal may be a non-inversion terminal, and the second input terminal may be an inversion terminal. The constant current source may further include a plurality of selection switches having both ends that are connected between an offset reference current source that supplies the offset reference current and one end of each of the detection resistors. The offset reference current may be smaller than the setting channel current. The constant current source may include a reference current setting unit that generates the offset reference current and the channel reference current using a set reference current; a plurality of reference resistors having one end that is connected to a plurality of channel current sources that supply the channel reference current and having the grounded other end; a plurality of sync current sources that are connected to an end portion of each of the plurality of LED channels to synchronize the plurality of channel currents; a plurality of setting resistors having one end that is connected to an offset reference current source that supplies the offset reference current and having the grounded other end for the offset setting period; and a plurality of offset voltage setting units that set the offset voltage according to the output of the plurality of operating amplifiers.

Each of the plurality of sync current sources may include a control switch having a drain terminal that is connected to an end portion of each of the plurality of LED channels; a detection resistor having one end that is connected to a source terminal of the control switch and having the grounded other end, wherein the first input terminal of the operating amplifier may be connected to the reference resistor, the second input terminal thereof may be connected to the setting resistor for the offset setting period and be connected to the detection resistor after the offset setting period, and an output terminal thereof may be connected to a gate terminal of the control switch. The first input terminal may be a non-inversion terminal, and the second input terminal may be an inversion terminal. Each of the plurality of sync current sources may further include a first connection switch that is connected between one end of the detection resistor and the second input terminal. The constant current source may further include a plurality of selection switches having both ends that are connected between an offset reference current source that supplies the offset reference current and one end of each of the plurality of setting resistors; and a plurality of second connection switches having both ends that are connected between one end of each of the plurality of setting resistors and the second input terminal.

An LED light emitting device includes a plurality of LED channels that are formed with a plurality of LED elements that are continuously connected in series, a plurality of operating amplifiers that control each channel current flowing to the plurality of LED channels to be a predetermined setting channel current, a plurality of reference resistors that are connected to first input terminals of each of the plurality of operating amplifiers, and a plurality of detection resistors that are connected to second input terminals of each of the plurality of operating amplifiers.

Another embodiment of the present invention provides a method of driving an LED light emitting device, the method including: inputting a reference voltage according to the reference resistor and a predetermined channel reference current to the first input terminal; inputting a feedback voltage according to the detection resistor and a predetermined offset reference current to the second input terminal; and setting an offset voltage of the plurality of operating amplifiers so that a difference between the feedback voltage and the reference voltage may be identical to an offset voltage. The method may further include inputting a feedback voltage according to the channel current and the detection resistor to the second terminal after the setting of an offset voltage. The offset reference current may have the magnitude identical to that of the setting channel current.

Yet another embodiment of the present invention provides a method of driving an LED light emitting device including a plurality of LED channels that are formed with a plurality of LED elements that are continuously connected in series, a plurality of operating amplifiers that control each channel current flowing to the plurality of LED channels to be a predetermined setting channel current, a plurality of reference resistors that are connected to first input terminals of each of the plurality of operating amplifiers, and a plurality of detection resistors and a plurality of setting resistors that are connected to second input terminals of each of the plurality of operating amplifiers, the method including: inputting a reference voltage according to the reference resistor and a predetermined channel reference current to the first input terminal; inputting a feedback voltage according to the setting resistor and a predetermined offset reference current to a second input terminal; and setting an offset voltage of the plurality of operating amplifiers so that a difference between the feedback voltage and the reference voltage may be identical to an offset voltage. The method may further include inputting a feedback voltage according to the channel current and the detection resistor to the second terminal after the setting of an offset voltage. The offset reference current may be smaller than the setting channel current.

As described above, according to characteristics of the present invention, an LED light emitting device and a method of driving the same that can uniformly supply the magnitude of a channel current flowing to a plurality of LED channels are provided.

DETAILED DESCRIPTION OF THE EMBODIMENTS

Figure 1:
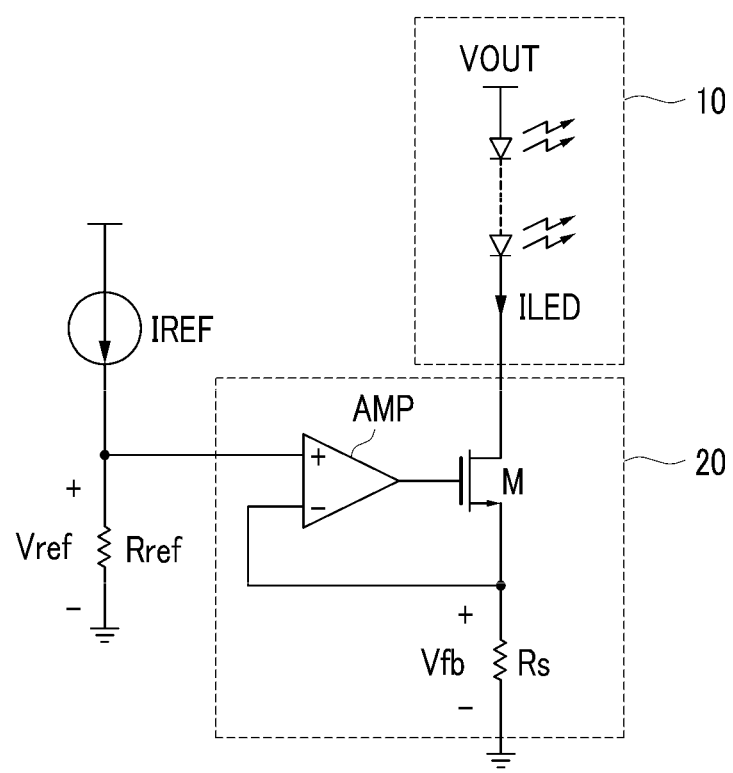
FIG. 1 is a diagram illustrating an LED light emitting device.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout this specification and the claims that follow, when it is described that an element is "coupled" to another element, the element may be "directly coupled" to the other element or "electrically coupled" to the other element through a third element. In addition, unless explicitly described to the contrary, the word "comprise" and variations such as "comprises" or "comprising", will be understood to imply the inclusion of stated elements but not the exclusion of any other elements.

Figure 2:
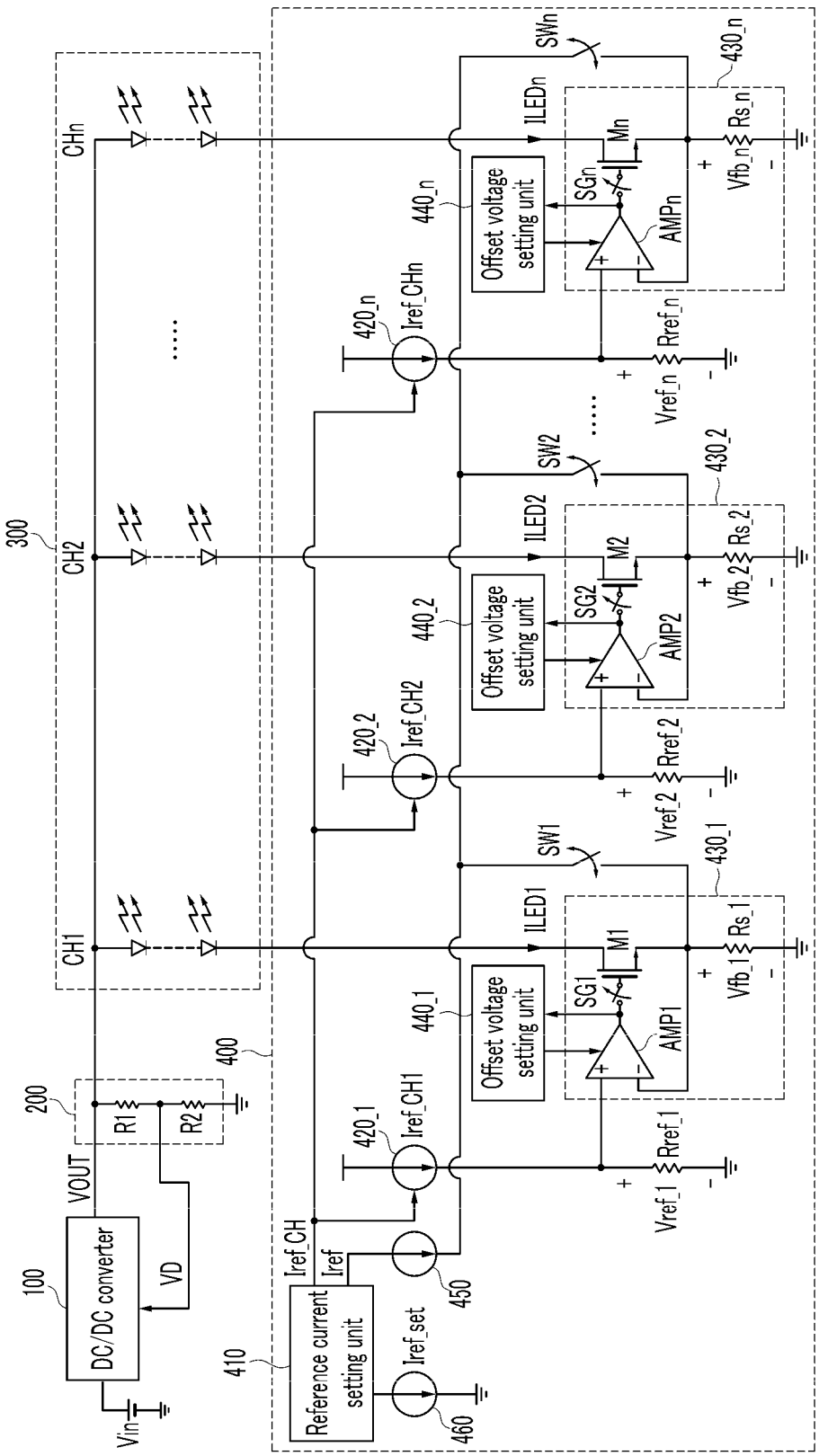
FIG. 2 is a diagram illustrating an LED light emitting device according to a first exemplary embodiment of the present invention.

FIG. 2 is a diagram illustrating an LED light emitting device according to a first exemplary embodiment of the present invention.

Referring to FIG. 2, the LED light emitting device includes a DC/DC converter 100, a resistor distribution unit 200, an LED light emitting unit 300, and a constant current source 400. The DC/DC converter 100 receives an input voltage Vin to generate a predetermined level of output voltage VOUT. The DC/DC converter 100 detects a distribution voltage VD to control an output voltage VOUT. The resistor distribution unit 200 distributes resistance of the output voltage VOUT of the DC/DC converter 100 to output a distribution voltage VD. The resistor distribution unit 200 includes resistors R1 and R2. The resistor R1 and the resistor R2 are connected in series between an output stage and a ground stage of the DC/DC converter 100.

The LED light emitting unit 300 includes a plurality of LED channels CH1-CHn. A plurality of LED elements are connected in series with the same quantity to a plurality of LED channels CH1-CHn, respectively. The constant current source 400 controls the magnitude of each of LED channel currents ILED1-ILEDn according to a channel reference current Iref_CH. The constant current source 400 sets an offset voltage of each of a plurality of operating amplifiers AMP1-AMPn corresponding to each of the LED channels CH1-CHn using an offset reference current Iref. For this reason, the constant current source 400 includes a reference current setting unit 410, a plurality of selection switches SW1-SWn, a plurality of channel reference current sources 420_1-420_n, a plurality of sync current sources 430_1-430_n, a plurality of offset voltage setting units 440_1-440_n, an offset reference current source 450, and a set reference current source 460.

The reference current setting unit 410 generates an offset reference current Iref and a channel reference current Iref_CH using a set reference current Iref_set of the set reference current source 460. Specifically, the reference current setting unit 410 copies a set reference current Iref_set according to predetermined gains K1 and K2 to generate an offset reference current Iref and a channel reference current Iref_CH. Therefore, the offset reference current Iref is a value that multiplies the gain K1 to the set reference current Iref_set, and the channel reference current Iref_CH is a value that multiplies the gain K2 to the set reference current Iref_set. In this case, the offset reference current Iref has the magnitude identical to that of a predetermined channel current (hereinafter, referred to as a 'setting channel current ILED_set') so that channel currents ILED1-ILEDn of a desired magnitude may flow to a plurality of LED channels CH1-CHn. Each of the plurality of selection switches SW1-SWn is connected between an offset reference current source 450 that generates the offset reference current Iref and one end of a plurality of detection resistors Rs_1-Rs_n to selectively transfer the offset reference current Iref to a plurality of detection resistors Rs_1-Rs_n. The plurality of selection switches SW1-SWn are turned on for an offset setting period for adjusting an offset voltage of each of a plurality of operating amplifiers AMP1-AMPn. The LED light emitting device according to an exemplary embodiment of the present invention adjusts an offset voltage of each of the plurality of operating amplifiers AMP1-AMPn in an initial operation. In order to adjust an offset voltage of each of the plurality of operating amplifiers AMP1-AMPn, the offset reference current Iref can be sequentially transferred to a plurality of detection resistors Rs_1-Rs_n.

Each of the plurality of channel reference current sources 420_1-420_n copies the channel reference current Iref_CH to generate a plurality of channel reference currents Iref_CH1-Iref_CHn having the same magnitude as that of the channel reference current Iref_CH. The first channel reference current source 420_1 is connected to one end of the first reference resistor Rref_1 and a non-inversion terminal (+) of the first operating amplifier AMP1. One end of the first reference resistor Rref_1 is connected to a non-inversion terminal (+) of the first operating amplifier AMP1, and the other end thereof is grounded. Because the first channel reference current Iref_CH1 flows to the first reference resistor Rref_1, a first reference voltage Vref_1 is generated at one end of the first reference resistor Rref_1. The first reference voltage Vref_1 is determined according to the first channel reference current Iref_CH1 and the first reference resistor Rref_1. A configuration and operation of a second channel reference current source 420_2 and an N-th channel reference current source 420_n are identical to those of the first channel reference current source 420_1 and therefore a description thereof will be omitted.

Each of the plurality of sync current sources 430_1-430_n is connected to an end portion of the LED channels CH1-CHn to synchronize channel currents ILED1-ILEDn. The first sync current source 430_1 includes a first operating amplifier AMP1, a first operating amplifier connection switch SG1, a first control switch M1, and a first detection resistor Rs_1. The first operating amplifier AMP1 receives a first reference voltage Vref1 in a non-inversion terminal (+) and receives a source voltage of the first control switch M1, i.e., a first feedback voltage Vfb1 in an inversion terminal (−). One end of the first operating amplifier connection switch SG1 is connected to the output of the first operating amplifier AMP1, and the other end thereof is connected to a gate terminal of the first control switch M1. A drain terminal of the first control switch M1 is connected to an end portion of the first channel CH1. One end of the first detection resistor Rs_1 is connected to a contact point of a source terminal of the first control switch M1 and an inversion terminal (−) of the first operating amplifier AMP1, and the other end thereof is grounded. Because one of the first channel current ILED1 and the offset reference current Iref flowing through the first control switch M1 flows to the first detection resistor Rs_1, a first feedback voltage Vfb_1 is generated at one end of the first detection resistor Rs_1. That is, when the first selection switch SW1 is turned off, the first feedback voltage Vfb_1 is generated according to the first channel current ILED1 and the first detection resistor Rs_1 flowing through the first control switch M1. When the first selection switch SW1 is tuned on and the first operating amplifier connection switch SG1 is tuned off, the first feedback voltage Vfb_1 is generated according to the offset reference current Iref and the first detection resistor Rs_1. Therefore, the first feedback voltage Vfb_1 is determined according to on/off of the first selection switch SW1. In an exemplary embodiment of the present invention, in order to detect and adjust an offset voltage of the first operating amplifier AMP1, the first feedback voltage Vfb_1 generating when the offset reference current Iref flows to the first detection resistor Rs_1 is used. After adjustment of an offset voltage of all operating amplifiers AMP1-AMPn is complete, when the LED light emitting device operates, a first feedback voltage Vfb_1 generating when the channel current ILED1 flows to the first detection resistor Rs_1 is used.

A configuration and operation of a second operating amplifier AMP2, a second operating amplifier connection switch SG2, a second control switch M2, and a second detection resistor Rs_2 of the second sync current source 430_2 and an N-th operating amplifier AMPn, an N-th operating amplifier connection switch SGn, an N-th control switch Mn, and an N-th detection resistor Rs_n of an N-th sync current source 430_n are identical to those of the first operating amplifier AMP1, the first control switch M1, the first operating amplifier connection switch SG1, and the first detection resistor Rs_1 of the first sync current source 430_1 and therefore a description thereof will be omitted. In an exemplary embodiment of the present invention, a plurality of switches M1-Mn are formed with an NMOSFET but are not limited thereto and may be formed with a PMOSFET or a BJT.

When an offset reference current Iref flows to the corresponding channels CH1-CHn, each of the plurality of offset voltage setting units 440_1-440_n detects the output of the corresponding operating amplifiers AMP1-AMPn, and an offset voltage of the corresponding operating amplifiers AMP1-AMPn is set to be identical to a difference between the corresponding reference voltages Vref_1-Vref_n and the corresponding feedback voltages Vfb_1-Vfb_n. In each of the operating amplifiers AMP1-AMPn, an offset voltage exists between an inversion terminal (−) and a non-inversion terminal (+), and such an offset voltage generates a control error. However, by appropriately adjusting an offset voltage, an error of an offset voltage and an error of the above-described resistor and current can be cancelled. In each of the operating amplifiers AMP1-AMPn, if a voltage that subtracts a voltage of an inversion terminal (−) from a voltage of a non-inversion terminal (+) is larger than an offset voltage, the output of the operating amplifier becomes a maximum of a maximum and a minimum. If a voltage that subtracts a voltage of an inversion terminal (−) from a voltage of a non-inversion terminal (+) is smaller than an offset voltage, the output of the operating amplifier becomes a minimum. Each of the plurality of offset voltage setting units 440_1-440_n according to the first exemplary embodiment of the present invention receives an output voltage of the operating amplifier that is output according to a difference between corresponding feedback voltages Vfb_1-Vfb_n and reference voltages Vref_1-Vref_n, selects an offset voltage of a point at which the output first becomes a minimum by gradually increasing an offset voltage when a first output of each of the operating amplifiers AMP1-AMPn is a maximum, and selects an offset voltage of a point at which the output first becomes a maximum by gradually decreasing an offset voltage when a first output of each of the operating amplifiers AMP1-AMPn is a minimum. In such a method, an offset voltage of each of the operating amplifiers AMP1-AMPn is set to be identical to a difference between corresponding reference voltages Vref_1-Vref_n and corresponding feedback voltages Vfb_1-Vfb_n. However, the present invention is not limited thereto, and an offset voltage of the operating amplifiers AMP1-AMPn can be set to be identical to a difference between reference voltages Vref_1-Vref_n and feedback voltages Vfb_1-Vfb_n corresponding thereto through other methods. For example, a width of decrease or increase of the offset voltage may be changed according to the number of times of adjustment.

First, a case of setting an offset voltage Voffset_1 of the first operating amplifier AMP1 will be described with reference to FIG. 3.

Figure 3:
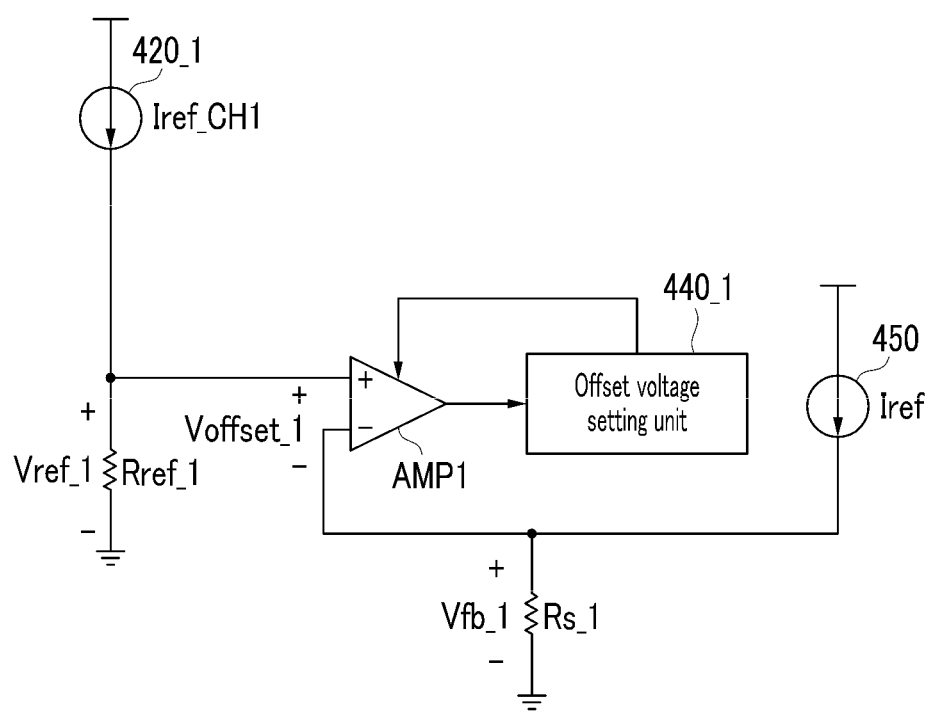
FIG. 3 is a diagram illustrating a connection relationship when setting an offset voltage according to a first exemplary embodiment of the present invention.

FIG. 3 is a diagram illustrating a connection relationship when setting an offset voltage according to a first exemplary embodiment of the present invention.

First, when the first selection switch SW1 is turned on and the first operating amplifier connection switch SG1 is turned off, an offset reference current Iref is transferred to a source terminal of the first control switch M1. Accordingly, the first feedback voltage Vfb_1 is calculated by Equation 2.

$$Vfb\_1 = (Rs\_1 + Rs\_1\_error) * Iref \quad \text{(Equation 2)}$$

(where Rs_1_error is an error value of the first detection resistor Rs_1)

The first channel reference current Iref_CH1 flows to the first reference resistor Rref_1 and thus the first reference voltage Vref_1 is calculated by Equation 3.

$$Vref\_1 = (Rref\_1 + Rref\_1\_error) * (Iref\_CH1 + Iref\_CH1\_error) \quad \text{(Equation 3)}$$

(where Rref_1_error is an error value of the first reference resistor Rref_1, and Iref_CH1_error is an error value of the first channel reference current Iref_CH1)

Accordingly, the first offset voltage setting unit 440_1 sets an offset voltage Voffset_1 so that an offset voltage Voffset_1 of the first operating amplifier AMP1 is identical to a difference between the first reference voltage Vref_1 and the first feedback voltage Vfb_1. That is, the offset voltage Voffset_1 is represented by Equation 4.

$$Voffset\_1 = Vref\_1 - Vfb\_1 \quad \text{(Equation 4)}$$

Here, the offset voltage Voffset_1 is calculated by Equation 5 by substituting the first feedback voltage Vfb_1 and the first reference voltage Vref_1 that are calculated by Equation 2 and Equation 3.

$$\begin{aligned}
Voffset\_1 &= \{(Rref\_1 + Rref\_1\_error) * (Iref\_CH1 + Iref\_CH1\_error)\} - \{(Rs\_1 + Rs\_1\_error) * Iref\} \\
&= Rref\_1 * Iref\_CH1 + Rref\_1 * Iref\_CH1\_error + Rref\_1\_error * Iref\_CH1 + Rref\_1\_error * Iref\_CH1\_error - Rs\_1 * Iref - Rs\_1\_error * Iref
\end{aligned} \quad \text{(Equation 5)}$$

In Equation 5, 'Rref_1*Iref_CH1' and 'Rs_1*Iref' are values having no error and thus are cancelled. In the first exemplary embodiment of the present invention, because the offset reference current Iref is trimmed to be identical to the setting channel current ILED_set, the offset voltage Voffset_1 is set by Equation 6. Specifically, the first operating amplifier AMP1 outputs a minimum value or a maximum value according to a difference between the reference voltage Vref_1 and the feedback voltage Vfb_1 and an offset voltage of the operating amplifier AMP_1. The first offset voltage setting unit 440_1 selects an offset voltage of a point at which the output is a first minimum by gradually increasing the offset voltage when a first output of the first operating amplifier AMP1 is a maximum and selects an offset voltage of a point at which the output is a first maximum by gradually decreasing the offset voltage when a first output of the first operating amplifier AMP1 is a minimum. When an offset voltage is adjusted with such a method, an offset voltage Voffset_1 in which an increase or decrease width of the offset voltage is adjusted to be small at each step is represented by Equation 6.

$$Voffset\_1 = Rref\_1 * Iref\_CH1\_error + Rref\_1\_error * Iref\_CH1 + Rref\_1\_error * Iref\_CH1\_error - Rs\_1\_error * ILED\_set \quad \text{(Equation 6)}$$

Thereafter, the first selection switch SW1 is turned off, and the first operating amplifier connection switch SG1 is turned on. Before the offset voltage is adjusted, when the first channel current ILED1 flows to the first channel CH1, the first channel current ILED1 is defined by Equation 7.

$$\begin{aligned} ILED1 &= ILED\_set + ILED\_error \\ &= (Rref\_1/Rs\_1)*Iref\_CH1 + (1/Rs\_1)*(Rref\_1*Iref\_CH1\_error + Rref\_1\_error*Iref\_CH1\_error + Rref\_1\_error*Iref\_CH1 - Rs\_1\_error*ILED\_set - Voffset\_1) \end{aligned}$$ (Equation 7)

In Equation 7, "ILED_error" is an error of the setting channel current ILED_set. "(Rref_1/Rs_1)*Iref_CH1" is ILED_set, and "(1/Rs_1)*(Rref_1*Iref_CH1_error+ Rref_1_error*Iref_CH1_error+Rref_1_error*Iref_CH1 Rs_1_error*ILED_set Voffset_1)" is "ILED_error".

After the offset voltage is adjusted and the offset voltage is set as represented by Equation 6, by substituting an offset voltage Voffset_1 that is set as represented by Equation 6 to Equation 7, an error value ILED_error of the setting channel current ILED_set becomes '0'. That is, all errors of the first reference resistor Rref_1, the first detection resistor Rs_1, the first offset voltage Voffset_1, and the setting channel current ILED_set are removed and thus the magnitude of the first channel current ILED1 is identical to that of the setting channel current ILED_set. When offset voltages Voffset_2-Voffset_n of each of a plurality of operating amplifiers AMP2-AMPn corresponding to a plurality of channels CH2-CHn are set with the above method, the channel currents ILED1-ILEDn can flow in a predetermined magnitude without an error.

Figure 4:
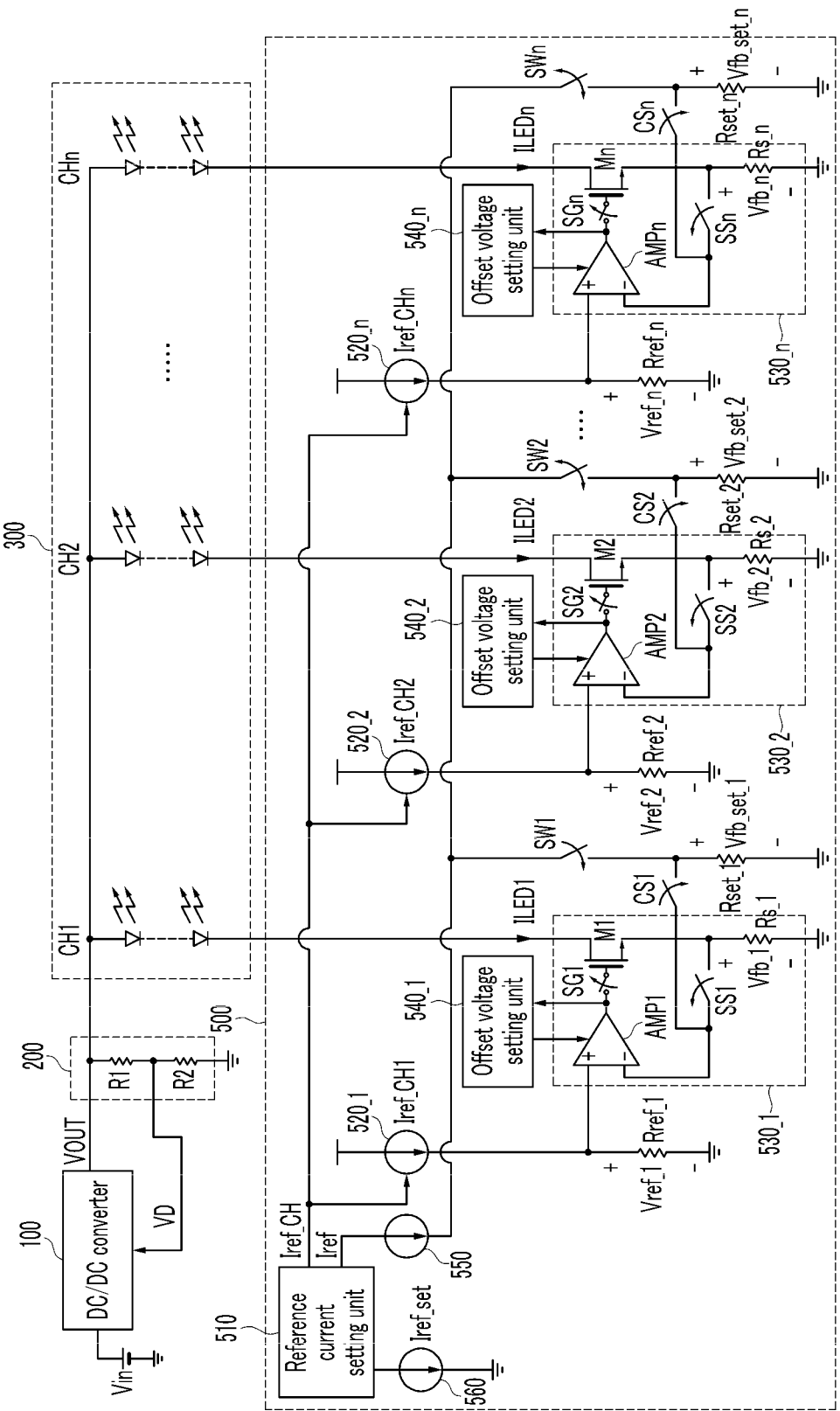
FIG. 4 is a diagram illustrating an LED light emitting device according to a second exemplary embodiment of the present invention.

FIG. 4 is a diagram illustrating an LED light emitting device according to a second exemplary embodiment of the present invention.

Referring to FIG. 4, the LED light emitting device includes a DC/DC converter 100, a resistor distribution unit 200, an LED light emitting unit 300, and a constant current source 500. In FIG. 4, a configuration of the DC/DC converter 100, the resistor distribution unit 200, and the LED light emitting unit 300 is identical to that of FIG. 2 and are substantially equal to those denoted by the same reference numerals in FIG. 2 and thus a description thereof will be omitted.

The constant current source 500 includes a reference current setting unit 510, a plurality of selection switches SW1-SWn, a plurality of offset reference resistor connection switches CS1-CSn, a plurality of detection resistor connection switches SS1-SSn, a plurality of operating amplifier connection switches SG1-SGn, a plurality of setting resistors Rset_1-Rset_n, a plurality of channel reference current sources 520_1-520_n, a plurality of sync current sources 530_1-530_n, a plurality of offset voltage setting units 540_1-540_n, an offset reference current source 550, and a set reference current source 560. The reference current setting unit 510 generates an offset reference current Iref and a channel reference current Iref_CH using a set reference current Iref_set of the set reference current source 560. Specifically, the reference current setting unit 510 copies the set reference current Iref_set according to predetermined gains 1/K1 and K2 to generate an offset reference current Iref and a channel reference current Iref_CH. In this case, the gain K1 is set so that the offset reference current may be smaller than the setting channel current ILED_set.

One ends of the plurality of selection switches SW1-SWn are connected to the offset reference current source 550 that generates an offset reference current Iref, and the other ends thereof are connected to one ends of a plurality of setting resistors Rset_1-Rset_n, respectively. One ends of each of the plurality of offset reference resistor connection switch CS1-CSn are connected to inversion terminals (−) of a plurality of operating amplifiers AMP1-AMPn, and the other ends thereof are connected to the other ends of the plurality of selection switches SW1-SWn, respectively. One ends of each of the plurality of operating amplifier connection switches SG1-SGn are connected to the outputs of the plurality of operating amplifiers AMP1-AMPn, and the other ends thereof are connected to gate terminals of a plurality of control switches Mn, respectively. The plurality of selection switches SW1-SWn and the plurality of offset reference resistor connection switches CS1-CSn are turned on for an offset setting period and are turned off when an offset setting period is terminated. The plurality of operating amplifier connection switches SG1-SGn are turned off for an offset setting period and are turned on when an offset setting period is terminated. One ends of the plurality of setting resistors Rset_1-Rset_n are connected to the other ends of the plurality of connection switches CS1-CSn, respectively, and the other ends thereof are grounded. Because an offset reference current Iref flows in the plurality of setting resistors Rset_1-Rset_n, feedback voltages Vfb_set_1-Vfb_set_n are generated at one ends of each of the plurality of setting resistors Rset_1-Rset_n. The plurality of setting resistors Rset_1-Rset_n are set to the magnitude that multiplies the gain K1 to the plurality of detection resistors Rs_1-Rs_n so that multiplication of the plurality of setting resistors Rset_1-Rset_n and the offset reference current Iref may be identical to the reference voltages Vref_1-Vref_n. That is, the second exemplary embodiment of the present invention is different from the first exemplary embodiment of the present invention from a point that the magnitude of the offset reference current Iref is small set and that a plurality of setting resistors Rset_1-Rset_n having a large resistance value are separately provided. Therefore, in the second exemplary embodiment of the present invention, an offset voltage of each of the operating amplifiers AMP1-AMPn is set through the plurality of setting resistors Rset_1-Rset_n.

Each of the plurality of channel reference current sources 520_1-520_n copies a channel reference current Iref_CH to generate a plurality of channel reference currents Iref_CH1-Iref_CHn having the same magnitude as that of the channel reference current Iref_CH. The first channel reference current source 520_1 is connected to one end of the first reference resistor Rref_1 and a non-inversion terminal (+) of the first operating amplifier AMP1. One end of the first reference resistor Rref_1 is connected to a non-inversion terminal (+) of the first operating amplifier AMP1, and the other end thereof is grounded. Because the first channel reference current Iref_CH1 flows to the first reference resistor Rref_1, a first reference voltage Vref_1 is generated at one end of the first reference resistor Rref_1. The first reference voltage Vref_1 is determined according to the first channel reference current Iref_CH1 and the first reference resistor Rref_1. A configuration and operation of a second channel reference current source 520_2 and an N-th channel reference current source 520_n are identical to those of the first channel reference current source 520_1, and therefore a description thereof will be omitted.

The plurality of sync current sources 530_1-530_n are connected to an end portion of each of the channels CH1-CHn to synchronize a plurality of channel currents ILED1-ILEDn. The first sync current source 530_1 includes a first operating amplifier AMP1, a first operating amplifier connection switch SG1, a first control switch M1, a first detection resistor connection switch SS1, and a first detection resistor Rs_1. The first operating amplifier AMP1 receives a first reference voltage Vref1 in a non-inversion terminal (+) and receives a source voltage of the first control switch M1, i.e., one of a first feedback voltage Vfb1 and a first feedback voltage Vfb_set_1 receives in an inversion terminal (−). One end of the first operating amplifier connection switch SG1 is connected to the output of the first operating amplifier AMP1, and the other end thereof is connected to a gate terminal of the first control switch M1. A source terminal of the first control switch M1 is connected to one end of the first detection resistor Rs_1. One end of the first detection resistor connection switch SS1 is connected to an inversion terminal (−) of the first operating amplifier AMP1, and the other end thereof is connected to one end of the first detection resistor Rs_1. The first detection resistor connection switch SS1 and the first operating amplifier connection switch SG1 are turned off for an offset setting period and are turned on when the offset setting period is terminated. One end of the first detection resistor Rs_1 is connected to the other end of the first detection resistor connection switch SS1, and the other end thereof is grounded. Because the first channel current ILED1 flowing through the first control switch M1 flows to the first detection resistor Rs_1, a first feedback voltage Vfb_1 is generated at one end of the first detection resistor Rs_1.

A configuration of operation of a second operating amplifier AMP2, a second operating amplifier connection switch SG2, a second control switch M2, a second detection resistor connection switch SS2, and a second detection resistor Rs_2 of a second sync current source 530_2 and an N-th operating amplifier AMPn, an N-th operating amplifier connection switch SGn, an N-th control switch Mn, an N-th detection resistor connection switch SSn, and an N-th detection resistor Rs_n of an N-th sync current source 530_n are identical to those of the first operating amplifier AMP1, the first operating amplifier connection switch SG1, the first control switch M1, the first detection resistor connection switch SS1, and the first detection resistor Rs_1 of the first sync current source 530_1 and therefore a description thereof will be omitted. In an exemplary embodiment of the present invention, a plurality of switches M1-Mn are formed with an NMOSFET but is not limited thereto and may be formed with a PMOSFET or a BJT.

The plurality of offset voltage setting units 540_1-540_n detect the output of operating amplifiers AMP1-AMPn corresponding to a channel in which an offset reference current Iref flows among a plurality of channels CH1-CHn to set an offset voltage of each of the operating amplifiers AMP1-AMPn to be identical to a difference between corresponding reference voltages Vref_1-Vref_n and feedback voltages Vfb_set_1-Vfb_set_n.

First, a case of setting an offset voltage Voffset_1 of the first operating amplifier AMP1 will be described with reference to FIG. 5.

Figure 5:
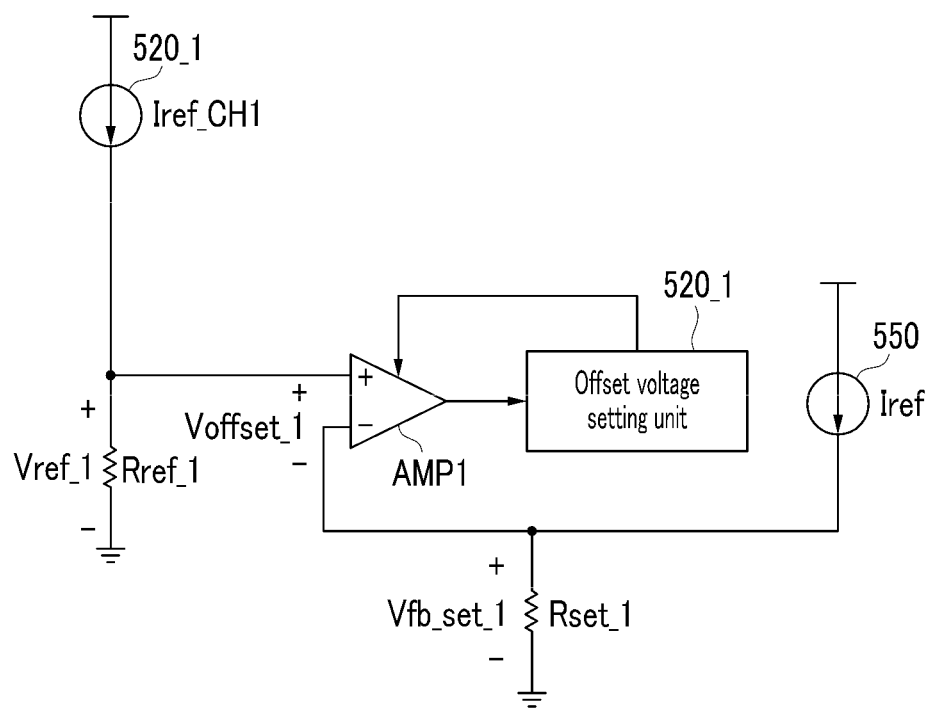
FIG. 5 is a diagram illustrating a connection relationship when setting an offset voltage according to a second exemplary embodiment of the present invention.

FIG. 5 is a diagram illustrating a connection relationship when setting an offset voltage according to a second exemplary embodiment of the present invention.

First, when the first selection switch SW1 and the first offset reference resistor connection switch CS1 are turned on and the first detection resistor connection switch SS1 and the first operating amplifier connection switch SG1 are turned off, the offset reference current Iref is transferred to the first setting resistor Rset_1. Accordingly, the first feedback voltage Vfb_1 is calculated by Equation 8.

$$Vfb\_1 = (Rset\_1 + Rset\_1\_error) * Iref \qquad \text{(Equation 8)}$$

(where Rset_1_error is an error value of the first setting resistor Rset_1)

Here, because the first setting resistor Rset_1 is K1 times of the first detection resistor Rs_1, the first setting resistor Rset_1 is defined by Equation 9.

$$Rset\_1 = K1 * (Rs\_1 + Rs\_1\_error)$$

$$= (K1 + K1\_error) * (Rs\_1 + Rs\_1\_error) \qquad \text{(Equation 9)}$$

(where K1_error is an error value of K1, and Rs_1_error is an error value of Rs_1)

Because the first channel reference current Iref_CH1 flows to the first reference resistor Rref_1, the first reference voltage Vref_1 is calculated by Equation 10.

$$Vref\_1 = (Rref\_1 + Rref\_1\_error) * (Iref\_CH1 + Iref\_CH1\_error) \qquad \text{(Equation 10)}$$

(where Rref_1_error is an error value of the first reference resistor Rref_1, and Iref_CH1_error is an error value of the first channel reference current Iref_CH1)

Accordingly, the first offset voltage setting unit 540_1 sets an offset voltage Voffset_1 so that the offset voltage Voffset_1 of the first operating amplifier AMP1 may be identical to a difference between the first reference voltage Vref_1 and the first setting feedback voltage Vfb_set_1. That is, the offset voltage Voffset_1 is represented by Equation 11.

$$Voffset\_1 = Vref\_1 - Vfb\_set\_1 \qquad \text{(Equation 11)}$$

Here, by substituting the first setting feedback voltage Vfb_set_1 and the first reference voltage Vref_1 that are calculated in Equation 8 and Equation 10, the offset voltage Voffset_1 is calculated by Equation 12.

$$Voffset\_1 = \{(Rref\_1 + Rref\_1\_error) * (Iref\_CH1 + Iref\_CH1\_error)\} - \{(K1 + K1\_error) * (Rs\_1 + Rs\_1\_error) * Iref\}$$

$$= Rref\_1 * Iref\_CH1 + Rref\_1 * Iref\_CH1\_error + Rref\_1\_error * Iref\_CH1\_error + Rref\_1\_error * Iref\_CH1 - K1 * Rs\_1 * Iref - K1 * Rs\_1\_error * Iref - K1\_error * Rs\_1 * Iref - K1\_error * Rs\_1\_error * Iref \qquad \text{(Equation 12)}$$

In Equation 12, because 'Rref_1*Iref_CH1' and 'K1*Rs_1*Iref' are values having no error, 'Rref_1*Iref_CH1' and 'K1*Rs_1*Iref' are canceled. In the second exemplary embodiment of the present invention, because the offset reference current Iref is controlled to be identical to a value that divides the setting channel current ILED_set by the gain K1, the offset voltage Voffset_1 is set by Equation 13.

$$Voffset\_1 = Rref\_1 * Iref\_CH1\_error + Rref\_1\_error * Iref\_CH1\_error + Rref\_1\_error * Iref\_CH1 - Rs\_1\_error * ILED\_set - K1\_error * Rs\_1 * Iref - K1\_error * Rs\_1\_error * Iref \qquad \text{(Equation 13)}$$

Thereafter, the first selection switch SW1 and the first offset reference resistor connection switch CS1 are turned off, and the first detection resistor connection switch SS1 and the first operating amplifier connection switch SG1 are turned on. When the first channel current ILED1 actually flows to the first channel CH1, the first channel current ILED1 is defined by Equation 14.

$$ILED1 = ILED\_set + ILED\_error$$

$$= (Rref\_1/Rs\_1) * Iref\_CH1 + (1/Rs\_1) * (Rref\_1 * Iref\_CH1\_error + Rref\_1\_error * Iref\_CH1\_error + Rref\_1\_error * Iref\_CH1 - Rs\_1\_error * ILED\_set - Voffset\_1) \qquad \text{(Equation 14)}$$

In Equation 14, by substituting an offset voltage Voffset_1 that is set as represented by Equation 13, an error value ILED_error of the setting channel current ILED_set becomes '(1/Rs_1)*(K1_error*Rs_1+K1_error*Rs_1_error)*Iref'. Here, because an error value K1_error of the gain K1 is very small as ±0.1%, an error value ILED_set_error of the channel current finally approaches '0'. Therefore, the channel current ILED1-ILEDn can flow in a predetermined magnitude without an error.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A light emitting diode (LED) light emitting device comprising:
   a plurality of LED channels that are arranged in parallel and formed with a plurality of LED elements that are continuously connected in series; and
   a constant current source that controls each channel current flowing to the plurality of LED channels according to a predetermined channel reference current to be a predetermined setting channel current,
   wherein the constant current source comprises a plurality of operating amplifiers that control the magnitude of each of the channel currents and sets an offset voltage of each of the plurality of operating amplifiers so that an actual channel current is identical to the predetermined setting channel current,
   wherein a feedback voltage generating according to a predetermined offset reference current for an offset setting period that sets the offset voltage of the plurality of operating amplifiers is input to a first input terminal of the operating amplifier, a reference voltage generating according to the channel reference current is input to a second input terminal of the operating amplifier, and a difference between a voltage of the second input terminal and a voltage of the first input terminal is identical to the offset voltage.

2. The LED light emitting device of claim 1, wherein the offset reference current is identical to the setting channel current.

3. The LED light emitting device of claim 2, wherein the constant current source comprises:
   a reference current setting unit that generates the offset reference current and the channel reference current using a set reference current;
   a plurality of reference resistors having one end that is connected to a plurality of channel reference current sources that supply the channel reference current and having the grounded other end;
   a plurality of sync current sources that are connected to an end portion of each of the plurality of LED channels to synchronize the plurality of channel currents; and
   a plurality of offset voltage setting units that set the offset voltage according to the output of the plurality of operating amplifiers.

4. The LED light emitting device of claim 3, wherein each of the plurality of sync current sources comprises:
   a control switch having a drain terminal that is connected to an end portion of each of the plurality of LED channels;
   a detection resistor having one end that is connected to a source terminal of the control switch and having a grounded other end; and
   the operating amplifier having the first input terminal that is connected to the reference resistor and having the second input terminal that is connected to one end of the detection resistor and having an output terminal that is connected to a gate terminal of the control switch after the offset voltage setting period.

5. The LED light emitting device of claim 4, wherein the first input terminal is a non-inversion terminal, and the second input terminal is an inversion terminal.

6. The LED light emitting device of claim 4, wherein the constant current source further comprises a plurality of selection switches having both ends that are connected between an offset reference current source that supplies the offset reference current and one end of each of the detection resistors.

7. The LED light emitting device of claim 1, wherein the offset reference current is smaller than the predetermined setting channel current.

8. The LED light emitting device of claim 7, wherein the constant current source comprises:
   a reference current setting unit that generates the offset reference current and the channel reference current using a set reference current;
   a plurality of reference resistors having one end that is connected to a plurality of channel current sources that supply the channel reference current and having a grounded other end;
   a plurality of sync current sources that are connected to an end portion of each of the plurality of LED channels to synchronize the plurality of channel currents;
   a plurality of setting resistors having one end that is connected to an offset reference current source that supplies the offset reference current and having the grounded other end for the offset setting period; and
   a plurality of offset voltage setting units that set the offset voltage according to the output of the plurality of operating amplifiers.

9. The LED light emitting device of claim 8, wherein each of the plurality of sync current sources comprises:
   a control switch having a drain terminal that is connected to an end portion of each of the plurality of LED channels; and
   a detection resistor having one end that is connected to a source terminal of the control switch and having the grounded other end,
   wherein the first input terminal of the operating amplifier is connected to the reference resistor, the second input terminal thereof is connected to the setting resistor for the offset setting period and is connected to the detection resistor after the offset setting period, and an output terminal thereof is connected to a gate terminal of the control switch after the offset setting period.

10. The LED light emitting device of claim 9, wherein the first input terminal is a non-inversion terminal, and the second input terminal is an inversion terminal.

11. The LED light emitting device of claim 9, wherein each of the plurality of sync current sources further comprises a first connection switch that is connected between one end of the detection resistor and the second input terminal.

12. The LED light emitting device of claim 1, wherein:
   each of the plurality of operating amplifiers comprises:
      a first input terminal to which a reference voltage according to the predetermined channel reference current is input; and
      a second input terminal to which a feedback voltage according to a predetermined offset reference current is input; and
   the offset voltage of each of the plurality of operating amplifiers is set according to a difference between the reference voltage and the feedback voltage.

13. The LED light emitting device of claim 9, wherein the constant current source comprises:
- a plurality of selection switches having both ends that are connected between the offset reference current source that supplies the offset reference current and one end of each of the plurality of setting resistors; and
- a plurality of second connection switches having both ends that are connected between one end of each of the plurality of setting resistors and the second input terminal.

14. A method of driving a light emitting diode (LED) light emitting device comprising a plurality of LED channels that are formed with a plurality of LED elements that are continuously connected in series, a plurality of operating amplifiers that control each channel current flowing to the plurality of LED channels to be a predetermined setting channel current, a plurality of reference resistors that are connected to first input terminals of each of the plurality of operating amplifiers, and a plurality of detection resistors that are connected to second input terminals of each of the plurality of operating amplifiers, the method comprising:
- inputting a reference voltage according to the reference resistor and a predetermined channel reference current to the first input terminal;
- inputting a feedback voltage according to the detection resistor and a predetermined offset reference current to the second input terminal; and
- setting an offset voltage of the plurality of operating amplifiers so that a difference between the reference voltage and the feedback voltage becomes the offset voltage of the plurality of operating amplifiers.

15. The method of claim 14, further comprising inputting a feedback voltage according to the channel current and the detection resistor to the second terminal after the setting of an offset voltage.

16. The method of claim 15, wherein the offset reference current has the magnitude identical to that of the setting channel current.

17. A method of driving a light emitting diode (LED) light emitting device comprising a plurality of LED channels that are formed with a plurality of LED elements that are continuously connected in series, a plurality of operating amplifiers that control each channel current flowing to the plurality of LED channels to be a predetermined setting channel current, and a plurality of reference resistors, a plurality of detection resistors, and a plurality of setting resistors that are connected to first input terminals of each of the plurality of operating amplifiers, the method comprising:
- inputting a reference voltage according to the reference resistor and a predetermined channel reference current to the first input terminal;
- inputting a setting feedback voltage according to the setting resistor and a predetermined offset reference current to the second input terminal; and
- setting an offset voltage of the plurality of operating amplifiers so that a difference between the reference voltage and the setting feedback voltage becomes the offset voltage of the plurality of operating amplifiers.

18. The method of claim 17, further comprising inputting a feedback voltage according to the channel current and the detection resistor to the second terminal after the setting of an offset voltage.

19. The method of claim 18, wherein the offset reference current is smaller than the setting channel current.

* * * * *